United States Patent [19]
Nishino

[11] Patent Number: 4,720,070
[45] Date of Patent: Jan. 19, 1988

[54] HEIGHT ADJUSTER OPERATION MECHANISM FOR AN AUTOMOTIVE SEAT

[75] Inventor: Takaichi Nishino, Akishima, Japan
[73] Assignee: Tachi-S Co., L.T.D., Japan
[21] Appl. No.: 927,353
[22] Filed: Nov. 4, 1986
[51] Int. Cl.[4] ............................................. F16M 11/12
[52] U.S. Cl. .................... 248/394; 248/396; 248/421; 248/422
[58] Field of Search ............... 248/396, 394, 395, 421, 248/422, 397, 419; 297/313; 192/67 R, 95

[56] References Cited

U.S. PATENT DOCUMENTS

| | | | |
|---|---|---|---|
| 812,817 | 2/1906 | Bryan | 192/95 |
| 1,957,785 | 5/1934 | Knapp | 248/422 |
| 2,594,882 | 4/1952 | DeRose | 248/394 |
| 4,159,095 | 6/1979 | Pallant | 248/396 |
| 4,345,708 | 8/1982 | Hubbard | 192/95 |
| 4,533,027 | 8/1985 | Otani | 297/328 |

FOREIGN PATENT DOCUMENTS 2032252 6/1972 Fed. Rep. of Germany ...... 248/394

Primary Examiner—Reinaldo P. Machado
Assistant Examiner—A. Chin-Shue
Attorney, Agent, or Firm—Oldham, Oldham & Weber Co.

[57] ABSTRACT

A height adjuster operation mechanism which is adapted to independently adjust the heights of the front and rear portions of a seat cushion of an automotive seat. In the operation mechanism, front and rear rotary shafts are rotatably mounted to the right and left upper rails of a seat adjuster, a driving rotary member for providing a driving rotary force to the working parts of a rear height adjuster to raise and lower the rear portion of the seat cushion is rotatably mounted to the front rotary shaft, a socket for providing a driving rotary force to the working parts of a front height adjuster to raise and lower the front portion of the seat cushion is mounted to the front rotary shaft integrally therewith, and an operation knob engageable with the driving rotary member or socket is axially movably mounted to the front rotary shaft between the socket and driving rotary member, so that by bringing the operation knob into engagement with the driving rotary member or socket and rotating the engaged operation knob the height of the rear or front portion of the seat cushion can be adjusted.

8 Claims, 7 Drawing Figures

HEIGHT ADJUSTER OPERATION MECHANISM FOR AN AUTOMOTIVE SEAT

BACKGROUND OF THE INVENTION

1. Field of the Invention

The present invention relates to an improved operation mechanism of a height adjusting device or height adjuster (a vertically adjusting mechanism) which is capable of adjusting independently the heights of the front and rear portions of a seat cushion (a sitting part of a seat) in an automotive seat.

2. Description of the Prior Art

In a type of a conventional height adjusting device which is adapted to raise or lower the front and rear portions of a seat cushion of an automotive seat independent of each other, an operation knob is located in the front portion of the seat, which results in a very poor operationability. Also, in another type of such conventional height adjusting device, although the operation knob is disposed on the side surface of the seat cushion, because the range of adjustment of height thereof is previously set stepwise, the height of the seat cannot be adjusted to an occupant's taste in a sufficient manner.

In order to avoid the above-mentioned disadvantages, there is proposed still another type of height adjusting device (for example, Japanese Utility Model Publication No. 16622 of 1985), as shown in FIG. 1, wherein a lower arm (102) of a reclining adjuster is located on the side surface of a seat cushion (101), two rotary shafts (103), (104) are mounted onto the arm (102) such that they intersect the arm (102) at right angles, rotary members, that is, sector gears (105), (106) intermeshable with pinion gears (112), (113) in the rotary shafts (103), (104) are rotatably mounted to an upper rail of a seat adjuster respectively, one rotary member (105) is connected via a link (107) to the front portion of a seat cushion frame, the other rotary member (106) is connected to the rear portion of the seat cushion frame via a connecting rod (108) and a link (109), and two operation knobs (110), (111) are attached to the rotary members (105), (106), respectively.

However, according to the above-mentioned conventional height adjuster operation mechanism, as shown in FIG. 2 which is a perspective view thereof, due to the fact that two kinds of operation knobs (110), (111) respectively adapted to raise and lower the front and rear portions of the seat cushion independent of each other are disposed mutually in front and in rear of each other on the side surface of the seat cushion, they must be spaced apart from each other so as to avoid their wrong use, with the result that the front operation knob (110) is too far from the reach of an occupant and the rear operation (111) may often be abutted against the bottom through the thigh portion of the occupant when the occupant gets into or out of an automobile, impairing the sitting feeling of the occupant. Also, in view of space, the design of the operation mechanism is limited, which provides another drawback.

SUMMARY OF THE INVENTION

In view of the above-mentioned circumstances in the prior art height adjuster operation mechanism, it is an object of the invention to provide an improved height adjuster operation mechanism which is better in operationability, eliminates the possibility of the above-mentioned disagreeable abutment with the occupant, and can reduce design limitations.

In order to accomplish the above object, according to the height adjuster operation mechanism of the invention, there are provided in parallel on an upper rail of a seat adjuster a front rotary shaft for supplying a driving rotary force to the working parts of a front height adjuster which is adapted to raise and lower the front portion of a seat cushion frame and a rear rotary shaft for supplying a driving rotary force to the working parts of a rear height adjuster adapted to raise and lower the rear portion of the seat cushion frame, a driving rotary member is slidably engaged with the front rotary shaft and is connected to the rear rotary shaft via cooperative rotary means, a socket is fixed to the front rotary shaft, an axially movable operation knob is mounted on the front rotary shaft between the socket and the driving rotary member, and the operation knob is provided on the two sides thereof, one on the side of the socket and the other on the side of the driving rotary member, with engagement portions respectively engageable with the socket and the driving rotary member, whereby, if the operation knob is moved in the direction of the driving rotary member, then the operation knob can be brought into engagement with the driving rotary member, and, if it is moved in the direction of the socket, then it can be brought into engagement with the socket. Therefore, while the operation knob is in engagement with either the driving rotary member or the socket, if the operation knob is rotated, then the front rotary shaft or the rear rotary shaft is rotated to cause the front height adjuster working parts or the rear height adjuster working parts to be operated, so that the front portion or the rear portion of the seat cushion frame can be adjusted in height in an independent manner.

BRIEF DESCRIPTION OF THE DRAWINGS

The above and other objects, features, and advantages of the present invention will be more fully apparent to those of ordinary skill in the art to which this invention pertains from the following detailed description, when considered in connection with the accompanying drawings, in which like reference characters designate like or corresponding parts throughout the several views, and wherein.

DETAILED DESCRIPTION OF A PREFERRED EMBODIMENT OF THE INVENTION

A preferred embodiment of the invention will be described below in connection with the accompanying drawings.

Figure 1:
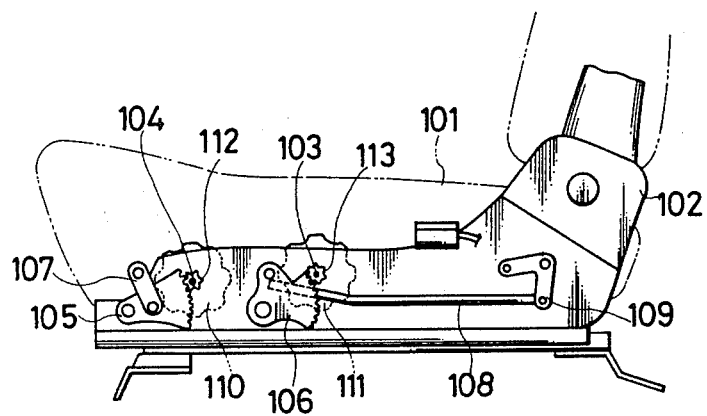
FIG. 1 is a side view of an example of an automotive seat employing a conventional height adjuster operation mechanism.
Figure 2:
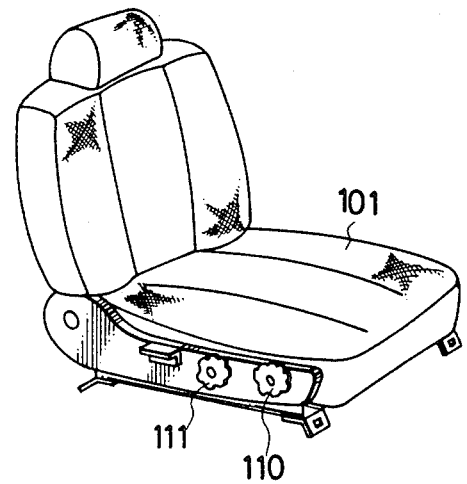
FIG. 2 is a perspective view of the above seat.
Figure 3:
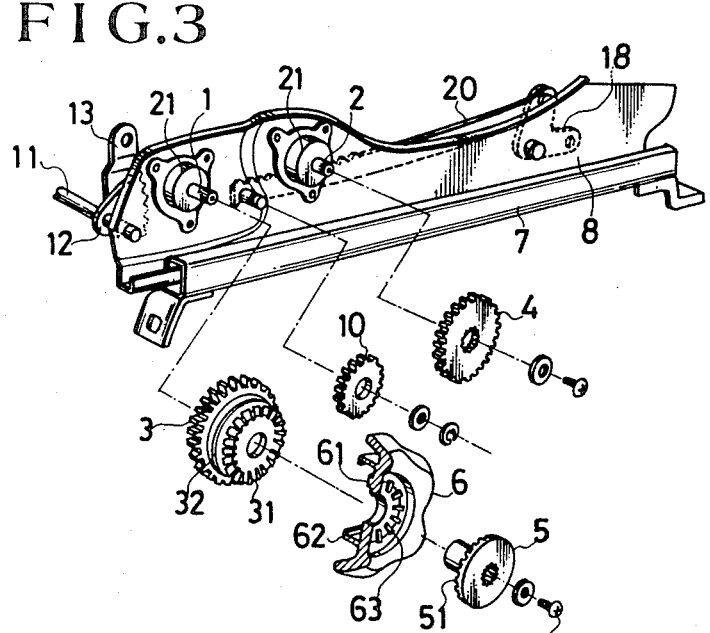
FIG. 3 is an exploded, perspective view of an embodiment of a height adjuster operation mechanism constructed in accordance with the invention.
Figure 4:
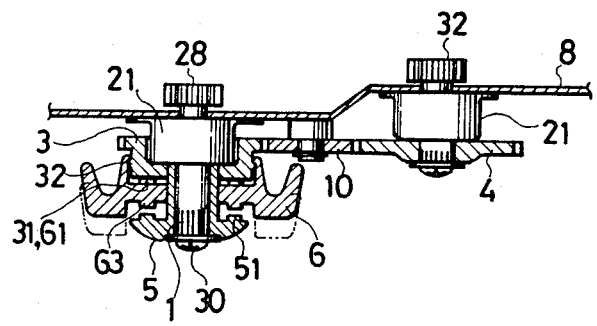
FIG. 4 is a section view of main portions of the above embodiment of the invention.
Figure 5:
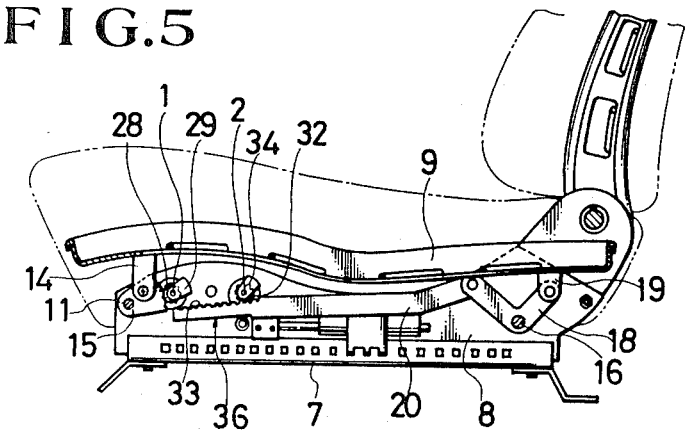
FIG. 5 is a side view of an automotive seat incorporating the above embodiment of the invention.
Figure 6:
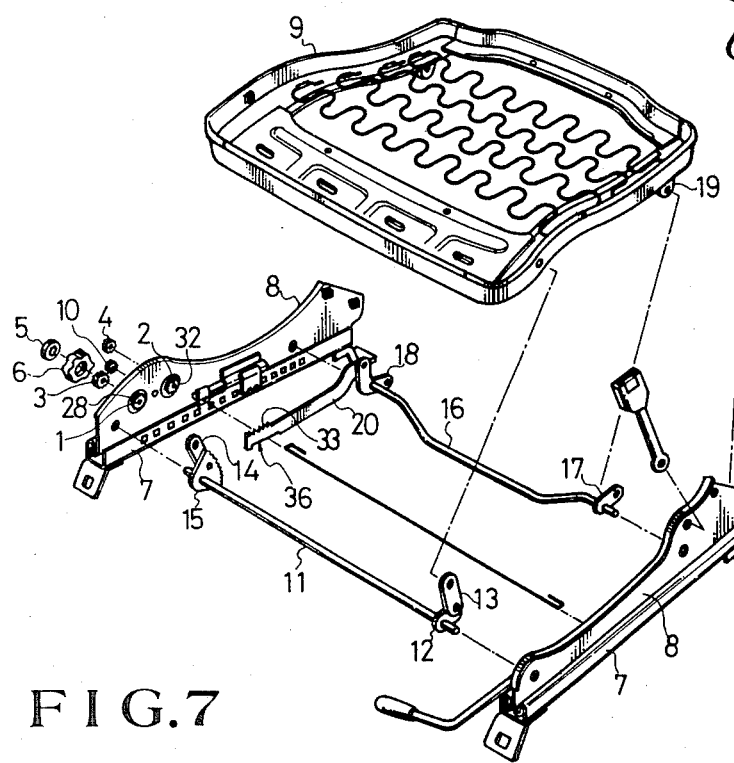
FIG. 6 is an exploded, perspective view to illustrate the working parts of the front and rear height adjusters of the invention; and, FIG. 7 is an exploded, perspective view of a brake mechanism well known and employed in the present height adjuster operation mechanism.

Referring now to FIG. 3, there is illustrated an exploded, perspective view of a height adjuster operation mechanism according to the present invention. In FIG. 3, reference numeral (1) designates a front rotary shaft which provides a driving rotary force to the working parts (11) (12) (13) (14) (15) of a front height adjuster for raising and lowering the front portion of a seat cushion frame (9); (2) a rear rotary shaft which provides a driving rotary force to the working parts (16) (17) (18) (20) of a rear height adjuster for raising and lowering the rear portion of the seat cushion frame (9); (3) a driving rotary member (a gear) which is rotatably fitted over the front rotary shaft (1); (4) a gear serving as cooperative rotary means which cooperates with an idler gear (10) to transmit the driving force of the driving rotary member (3) to the rear rotary shaft (2); (5) a socket fixed to the tip end of the front rotary shaft (1); and, (6) an operation knob which is mounted onto the front rotary shaft (1) between the driving rotary member (3) and the socket (5) in such a manner that it is free to move axially of the front rotary shaft and it is free to rotate peripherally thereof.

The side of the driving rotary member (3) on the side of the operation knob (6) is formed in a projected shape which projects toward the operation knob (6). The projected portion of the driving rotary shaft (3) is provided on the outer peripheral surface thereof with a peripherally extending, ring-shaped projecting strip (32), while it is provided on the side surface thereof with unevenly-shaped fitting teeth (31).

On the other hand, the operation knob (6) is provided on the side thereof located on the side of the driving rotary member (3) with an engagement claw (62) engageable with the projecting strip (32) of the driving rotary member (3) as well as with engagement teeth (61) engageable with the fitting teeth (31) of the driving rotary member (3). Therefore, if the operation knob (6) is moved in the direction of the driving rotary member (3), then the engagement teeth (61) of the operation knob (6) are brought into engagement with the fitting teeth (31) of the driving rotary member (3), and the engagement claw (62) of the operation knob (6) is brought into engagement with the projecting strip (32) of the driving rotary member (3). Thus, if the operation knob (6) is rotated, then the driving rotary member (3) is rotated. And, the rotational forces of the driving rotary member (3) are then transmitted to the gear (4) fixed to the rear rotary shaft (2) via the idler gear (10), with the result that the rear rotary shaft (2) is then rotated.

The above-mentioned socket (5) is provided on the side thereof located on the side of the operation knob (6) with unevenly-shaped teeth (51), and the operation knob (6) is also provided with a large number of projections (63) which are engageable with the teeth (51) of the socket (5). Thus, when the projections (63) of the operation knob (6) are moved toward the socket (5), then the operation knob (6) can be engaged with the socket (5), with the result that, if the operation knob (6) is rotated, the front rotary shaft (1) to which the socket (5) is fixed can be then rotated.

It should be noted here that the fitting teeth (31) of the driving rotary member (3), the engagement teeth (61) and projections (63) of the operation knob (6), and the teeth (51) of the socket (5) are called engagement portions in this specification, respectively.

Referring to the front height adjuster working parts, one end of a substantially L-shaped actuating link composed of two links (12)(13) and one end of another L-shaped actuating link composed of a link (14) and sector gear (15) are respectively fixed to a shaft (11) rotatably mounted to the right and left upper rails (8), and the other ends of the two actuating links are rotatably connected to the seat cushion frame (9), respectively, whereby the front portion of the seat cushion frame (9) can be raised and lowered by rotating the shaft (11).

On the other hand, in the rear height adjuster working parts, the first ends of a link (17) and a bell crank (18) are respectively fixed to a crankshaft (16) rotatably mounted to and supported by the right and left upper rails (8), and the other ends of the link (17) and bell crank (18) are rotatably connected to brackets (19) in the seat cushion frame (9), whereby the rear portion of the seat cushion frame (9) can be raised and lowered by means of rotation of the crankshaft (16). The rotational movements of the crankshaft (16) in the rear height adjuster working parts can be obtained by converting the rotational movements of the operation knob (6) into the linear displacements of a connecting rod (20) connected to one end of the bell crank (18) which is fixed to the cranshaft (16) and then transmitting the thus converted linear displacements to the crankshaft (16).

In the operation part for providing the driving forces to the two kinds of working parts, the above-mentioned front rotary shaft (1) and rear rotary shaft (2) respectively incorporating therein a well-known brake mechanism/device (21) are rotatably mounted on the upper rail (8) of the seat adjuster in parallel to each other such that they are located as close as possible to each other.

Figure 7:
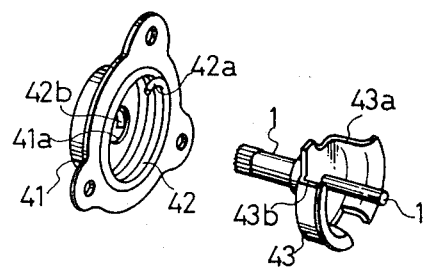

Next, an example of the brake mechanism (21) will be described in connection with FIG. 7. In this brake mechanism (21), a torsion spring coil (42), which is provided with two engagement portions (42a), (42b) respectively located at the two ends thereof, is fitted into and pressed against the internal peripheral portion of a circular outer case (41); a circular inner case (43), which is provided in the external peripheral portion thereof with two engagement edges (43a) (43b) respectively corresponding to the engagement portions (42a), (42b) of the torsion coil spring (42), is inserted into the inside of the torsion coil spring (42); and, the front rotary shaft (1) is fixed to the central portion of the outer surface of the inner case (43) and is also projected outwardly through an axial hole formed in the outer case (41).

Thus, in the brake mechanism (21), if the front rotary shaft (1) is rotated, then the inner case (43) is rotated integrally with the front rotary shaft (1) and thus the engagement edge (43a) of the inner case (43) is brought into abutment with the engagement portion (42a) of the torsion coil spring (42). In this condition, when the front rotary shaft (1) is further rotated, then the torsion coil spring (42) is caused to contract and is thus free from the internal peripheral surface of the outer case (41), so that the front rotary shaft (1) is free to rotate. Then, if the rotation of the front rotary shaft (1) is stopped at a desired position of rotation, then the torsion coil spring (42) is relieved from the pressure by the inner case (43) and thus restored to press against the internal peripheral surface of the outer case (41) again.

The above-mentioned front rotary shaft (1) meshes with the sector gear (15) via a pinion gear (28), drives the front height adjuster working parts, and thereby raises and lowers the front portion of the seat cushion frame (9). There is attached to the pinion gear (28) a locking plate (29) which is rotatable together with the pinion gear (28) and engageable with the sector gear (15) to limit the range of rotation of the pinion gear (28) so as to eliminate the possibility that the meshing of the pinion gear (28) with the sector gear (15) may be disengaged. In other words, the rotation of the operation knob (6) is allowed only within a predetermined range. It should be noted here that the front rotary shaft (1) is arranged such that it may not be rotated by loads which are applied from the sector gear (15) side. Also, the socket (5) is fixed to the front rotary shaft (1) by means of engagement of serrated grooves.)

The above-mentioned rear rotary shaft (2) meshes with a rack portion (33) formed in the tip end portion of the connecting rod (20) via a pinion gear (32), drives the rear height adjuster working parts, and thereby raises and lowers the rear portion of the seat cushion frame (9). As in the front rotary shaft (1), there is attached to the pinion gear (32) a locking plate (34) which is rotatable together with the pinion gear (32) and is engageable with the rack portion (33) of the connecting rod (20) to thereby limit the range of rotation of the pinion gear (32) so as to avoid the possibility that the pinion gear (32) may be disengaged out of the rack portion (33) in operation. It should be noted that the rack portion (33) in the front end portion of the connecting rod (20) is pushed in the top portion thereof from above by the pinion gear (28) of the front rotary shaft (1) which is placed on a roller with a flange rotatably mounted to the upper rail (8), with the result that the rack portion (33) can be supported firmly.

Also, the lower surface (36) of the connecting rod (20) to be abutted against the roller with a flange is formed in a curved shape so that the inclination of the connecting rod (20) can be freely changed according to the vertical displacements of the rear end portion of the connecting rod (20).

By the way, in the drawings, reference numeral (7) designates a lower rail of the seat adjuster.

In conclusion, the above-mentioned height adjusting device for an automotive seat according to the invention has the following advantages:

(1) Since it is possible to locate the front rotary shaft for providing the driving rotary force to the front height adjuster working parts and the rear rotary shaft for providing the driving rotary force to the rear height adjuster working parts close to each other, the distance between the mounting positions of two brake mechanisms respectively incorporated in the two rotary shafts can be narrowed. For this reason, the whole operation mechanism can be made compact so as to be able to provide space for arrangement of another operation mechanism.

(2) The front and rear portions of the seat cushion frame can be adjusted vertically, that is, can be raised and lowered independent of each other with a single operation knob, with result that the operation mechanism can be made more compact, the seat can be designed more freely, and the operationability of the operation mechanism is enhanced when compared with the above-mentioned conventional mechanisms.

What is claimed is:

1. A height adjuster operation mechanism for use in an automotive seat, comprising:

a front rotary shaft rotatably mounted to right and left upper rails of a seat adjuster so as to extend across said right and left upper rails for providing a driving rotary force to working parts of a front height adjuster to raise and lower the front portion of a seat cushion frame;

a rear rotary shaft rotatably mounted in the rear of said front rotary shaft to said right and left upper rails of said seat adjuster so as to extend across said right and left upper rails for providing a driving rotary force to working parts of a rear height adjuster to raise and lower the rear portion of said seat cushion frame;

a driving rotary member rotatably fitted on said front rotary shaft;

cooperative rotary means located between said front and rear rotary shafts and connected with both said driving rotary member and said rear rotary shaft;

a socket fixed to said front rotary shaft;

an operation knob axially movably mounted on said front rotary shaft between said driving rotary member and said socket;

said socket being provided on the side thereof facing said operation knob with an engagement portion which is engageable with said operation know; and, said driving rotary member being provided on the side thereof facing said operation knob with an engagement portion engageable with said operation knob, whereby, when said operation knob is moved axially to be brought into engagement with either said driving rotary member or said socket, then the rotational force of said operation knob can be transmitted to said driving rotary member or said socket to rotate said rear rotary shaft or said front rotary shaft respectively so as to adjust the height of a seat cushion of said automotive seat.

2. A height adjuster operation mechanism for use in an automotive seat as defined in claim 1, wherein said front height adjuster working parts are arranged such that a shaft is rotatably mounted to said right and left upper rails so as to extend therebetween, one end of an L-shaped actuating link composed of two link members is fixed to one end of said shaft, one end of another L-shaped actuating link composed of a further link member and a sector gear is fixed to the other end of said shaft, and the other ends of said two actuating links are rotatably connected to said seat cushion frame, whereby said front portion of said seat cushion frame can be raised and lowered by means of rotation of said shaft.

3. A height adjuster operation mechanism for use in an automotive seat as defined in claim 1, wherein said rear height adjuster working parts are arranged such that a crankshaft is rotatably mounted to said right and left upper rails so as to extend therebetween, one end of a link and one end of a bell crank are fixed to said crankshaft, and the other ends of said link and bell crank are rotatably connected to brackets provided in said seat cushion frame, whereby said rear portion of said seat cushion frame can be raised and lowered by means of rotation of said crankshaft.

4. A height adjuster operation mechanism for use in an automotive seat as defined in claim 1, wherein said front and rear rotary shafts are rotatably mounted to said upper rail of said seat adjuster in parallel to each other in such a manner that they are located as close as possible to each other.

5. A height adjuster operation mechanism for use in an automotive seat as defined in claim 1, wherein a pinion gear is fixed to one end of said front rotary shaft, said sector gear in said front height adjuster working parts meshes with said pinion gear, and said socket is fixed to the other end of said front rotary shaft, whereby, when said socket is rotated, then said pinion gear is rotated to actuate said front height adjuster working parts.

6. A height adjuster operation mechanism for use in an automotive seat as defined in claim 1, wherein said driving rotary member rotatably fitted on said front rotary shaft is a gear, an idler gear is interposed between said gear and a gear provided integrally with said rear rotary shaft, a rack portion provided in a front end portion of a connecting rod meshes with said gbear in said rear rotary shaft, and a base end of said connecting rod is rotatably mounted to said bell crank forming a part of said rear height adjuster working parts, whereby, when said driving rotary member of said front rotary shaft is rotated to cause said idler gear and said rear rotary shaft gear to rotate, then said connecting rod is pushed and pulled to rotate said bell crank so as to vertically adjust said rear portion of said seat cushion.

7. A height adjuster operation mechanism for use in an automotive seat as defined in claim 1, wherein said operation knob is mounted on said front rotary shaft between said socket and said driving rotary member such that it can be moved axially and rotated, and said operation knob is provided on the side thereof facing said driving rotary member with an engagement claw engageable with a projecting strip portion formed in said driving rotary member as well as with engagement teeth engageable with fitting teeth formed in said driving rotary member, whereby, when said operation knob is brought into engagement with said driving rotary member and is then rotated, then said driving rotary member is rotated to actuate said rear height adjuster working parts so as to vertically adjust the height of said rear portion of said seat cushion.

8. A height adjuster operation mechanism for use in an automotive seat as defined in claim 1, wherein said operation knob is provided on the side thereof facing said socket with a large number of projections intermeshable with teeth formed in said socket, whereby, when said operation knob is brought into engagement with said socket with said teeth of said socket intermeshing with said projections of said operation knob and is then rotated, then said front rotary shaft integral with said socket is rotated to actuate said front height adjuster working parts so as to vertically adjust the height of said front portion of said seat cushion.

* * * * *